US012754557B2

(12) United States Patent
Gualtieri et al.

(10) Patent No.: US 12,754,557 B2
(45) Date of Patent: Oct. 6, 2026

(54) SYSTEMS AND METHODS FOR DYNAMICALLY OFFLOADING ROBOTIC COMPUTATION TO THE CLOUD

(71) Applicant: Robert Bosch GmbH, Stuttgart (DE)

(72) Inventors: Marcus Gualtieri, Fremont, CA (US); Nan Tian, Foster City, CA (US); Michael Wang, Mountain View, CA (US); Arne Hamann, Ludwigsburg (DE); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 18/747,536

(22) Filed: Jun. 19, 2024

(65) Prior Publication Data

US 2025/0390096 A1 Dec. 25, 2025

(51) Int. Cl.

| | |
|---|---|
| ***G05D 1/24*** | (2024.01) |
| ***G05D 1/646*** | (2024.01) |
| ***G05D 101/00*** | (2024.01) |
| ***G05D 111/10*** | (2024.01) |
| ***G05D 111/30*** | (2024.01) |

(52) U.S. Cl.

CPC ............... *G05D 1/24* (2024.01); *G05D 1/646* (2024.01); *G05D 2101/22* (2024.01); *G05D 2111/10* (2024.01); *G05D 2111/32* (2024.01)

(58) Field of Classification Search

CPC .......... G05F 1/24; G05F 1/243; G05F 1/2462; G05F 1/646; G05F 2101/22; G05F 2105/10; G05F 2107/40; G05F 2109/10; G05F 2111/10; G05F 2111/32; G06F 9/4843; G06F 9/4856; G06F 9/4887; G06F 9/5027; G06F 9/5044; G06F 9/505; G06F 9/5055; G06F 9/5066; G06F 9/5088; G06F 9/5094; G06F 2209/501; G06F 2209/509

See application file for complete search history.

(56) References Cited

U.S. PATENT DOCUMENTS

| | | | |
|---|---|---|---|
| 8,639,644 | B1 | 1/2014 | Hickman et al. |
| 9,031,692 | B2 | 5/2015 | Zhu |
| 10,824,475 | B2 | 11/2020 | Kattepur et al. |
| 11,249,488 | B2 | 2/2022 | Dey et al. |

(Continued)

OTHER PUBLICATIONS

Open Robotics, "ROS: Robot Operating System," https://www.ros.org/, Apr. 4, 2023.

(Continued)

*Primary Examiner* — Blake A Wood

(74) *Attorney, Agent, or Firm* — Maginot, Moore & Beck LLP

(57) ABSTRACT

Methods for operating a mobile robot to dynamically offload computation tasks to a cloud system are described. The methods advantageously enable a mobile robot to switch between local execution by the mobile robot or remote execution by the cloud system at any time, depending on timing requirements, energy requirements, or any other requirements. Thus, the methods enable the mobile robots to be robust to varying network conditions, while at the same time taking advantage of off-board computing resources when possible. In at least some embodiments, a middleware such as Robot Operating System is leveraged for communication between mobile robots and with the cloud system.

19 Claims, 9 Drawing Sheets

(56) References Cited

U.S. PATENT DOCUMENTS

| | | | | |
|---|---|---|---|---|
| 11,460,861 | B2 | 10/2022 | Fox et al. | |
| 2016/0023351 | A1 | 1/2016 | Kuffner et al. | |
| 2018/0150085 | A1* | 5/2018 | Dey | G05D 1/0227 |
| 2018/0276049 | A1* | 9/2018 | Kattepur | G06F 11/3428 |
| 2019/0091865 | A1* | 3/2019 | Amacker | B25J 9/0003 |
| 2020/0171671 | A1* | 6/2020 | Huang | G05D 1/0088 |
| 2021/0302956 | A1* | 9/2021 | Sudhakaran | G05D 1/0027 |
| 2022/0019236 | A1* | 1/2022 | Ben-David | G05D 1/0297 |
| 2022/0118621 | A1* | 4/2022 | Paulitsch | B25J 13/089 |
| 2022/0143653 | A1* | 5/2022 | Berger | G05D 1/0291 |
| 2022/0317692 | A1 | 10/2022 | Guim Bernat et al. | |
| 2022/0350582 | A1* | 11/2022 | Go | G06F 8/61 |
| 2024/0053736 | A1* | 2/2024 | Inam | G06F 9/5027 |

OTHER PUBLICATIONS

Dillon et al., “Cloud Computing: Issues and Challenges,” 24th International Conference on Advanced Information Networking and Applications, 2010, IEEE Computer Society, DOI: 10.1109/AINA.2010.187.

Bonomi et al., “Fog Computing and Its Role in the Internet of Things,” Proceedings of the first edition of the MCC workshop on Mobile cloud computing, Aug. 17, 2012.

Chen et al., “FogROS: An Adaptive Framework for Automating Fog Robotics Deployment,” IEEE International Conference on Automation Science and Engineering, Aug. 25, 2021, arXiv:2108.11355v1.

Ichnowski et al., “FogROS2: An Adaptive Platform for Cloud and Fog Robotics Using ROS 2”, Apr. 24, 2023, arXiv:2205.09778v3.

Grieves et al., “Digital Twin: Mitigating Unpredictable Undesirable Emergent Behavior in Complex Systems”, Springer International Publishing Switzerland, 2017, DOI: 10.1007/978-3-319-875607_4.

Smith, “Open Dynamics Engine,” 2023, http://ode.org/.

Nvidia, “Nvidia Isaac ROS,” Mar. 2023, https://docs.nvidia.com/isaac/index.html.

Foxglove, “Foxglove Studio,” https://foxglove.dev/studio.

Chaari et al., “Towards a Distributed Computation Offloading Architecture for Cloud Robotics,” IEEE International Wireless Communications and Mobile Computing Conference, 2019, (10 Pages).

Bharti et al., “CoRoL: A Reliable Framework for Computation Offloading in Collaborative Robots,” IEEE Internet of Things Journal, vol. 9, No. 19, pp. 18195-18207, Oct. 1, 2022.

Hong et al., “QoS-Aware Cooperative Computation Offloading for Robot Swarms in Cloud Robotics,” IEEE Transactions on Vehicular Technology, vol. 68, No. 4, pp. 1-15, 2019.

Chaari et al., “Dynamic Computation Offloading for Ground and Flying Robots: Taxonomy, State of Art , and Future Directions,” Computer Science Review, vol. 45, pp. 1-57, 2022.

Enzai et al., “A Taxonomy of Computation Offloading in Mobile Cloud Computing,” Proceedings of the 2nd IEEE international conference on mobile cloud computing, services, and engineering, pp. 19-28, 2014.

Lin et al., “Computation Offloading Toward Edge Computing,” Proceedings of the IEEE, vol. 107, No. 8, pp. 1584-1607, Aug. 2019.

* cited by examiner

SYSTEMS AND METHODS FOR DYNAMICALLY OFFLOADING ROBOTIC COMPUTATION TO THE CLOUD

FIELD

The devices and methods disclosed in this document relate to mobile robot systems and, more particularly, to dynamically offloading robotic computation to the cloud.

BACKGROUND

Unless otherwise indicated herein, the materials described in this section are not admitted to be the prior art by inclusion in this section.

Mobile robots that navigate an environment to perform a task have become increasingly popular in recent years due to their convenience and effectiveness in performing tasks autonomously. In order to perform their tasks effectively, many mobile robots implement computationally expensive techniques for understanding their environment and for performing their tasks accurately and robustly. For example, in order to perform their tasks, many mobile robots are required to perform image processing, simultaneous localization and mapping (SLAM), and motion planning.

However, many mobile robots have limited on-board computing resources. This is particularly the case for payload-limited, battery-powered mobile robots, such as robot vacuum cleaners and unmanned aerial vehicles (UAVs). As a result, such mobile robots may have limited capacity to operate for extended periods of time or to perform tasks requiring fast computations.

Accordingly, what is needed is a method for operating a mobile robot in a manner that reduces the computational burden on the mobile robot, while also enabling the mobile robot to nonetheless benefit from computationally expensive techniques for understanding their environment and for performing their tasks accurately and robustly.

SUMMARY

A method for operating a mobile robot is disclosed. The method comprises receiving, with a local processing system of the mobile robot, input data with respect to which a computation task is to be performed. The method further comprises determining whether the computation task is to be offloaded to a remote processing system for computation. The method further comprises in response to determining that the computation task is to be offloaded to the remote processing system for computation, (i) transmitting, with a transceiver of the mobile robot, a message to the remote processing system, the message including the input data, and (ii) receiving, with the transceiver, an output of the computation task from the remote processing system. The method further comprises in response to determining that the computation task is not to be offloaded to the remote processing system for computation, determining the output of the computation task using the local processing system. The method further comprises operating, with the local processing system, the mobile robot based on the output of the computation task.

A method for remotely performing computations for a mobile robot is also disclosed. The method comprises storing, in a memory of a remote computer, second program instructions that include a copy of first program instructions used by the mobile robot to perform a computation task. The method further comprises receiving, with a remote processing system of the remote computer, a message from a mobile robot, the message including input data and indicating the computation task to be performed with respect to the input data. The method further comprises determining, with the remote processing system, an output of the computation task by executing the second program instructions. The method further comprises transmitting the output of the computation task to the mobile robot.

BRIEF DESCRIPTION OF THE DRAWINGS

The foregoing aspects and other features of the systems and methods are explained in the following description, taken in connection with the accompanying drawings.

DETAILED DESCRIPTION

Figure 1:
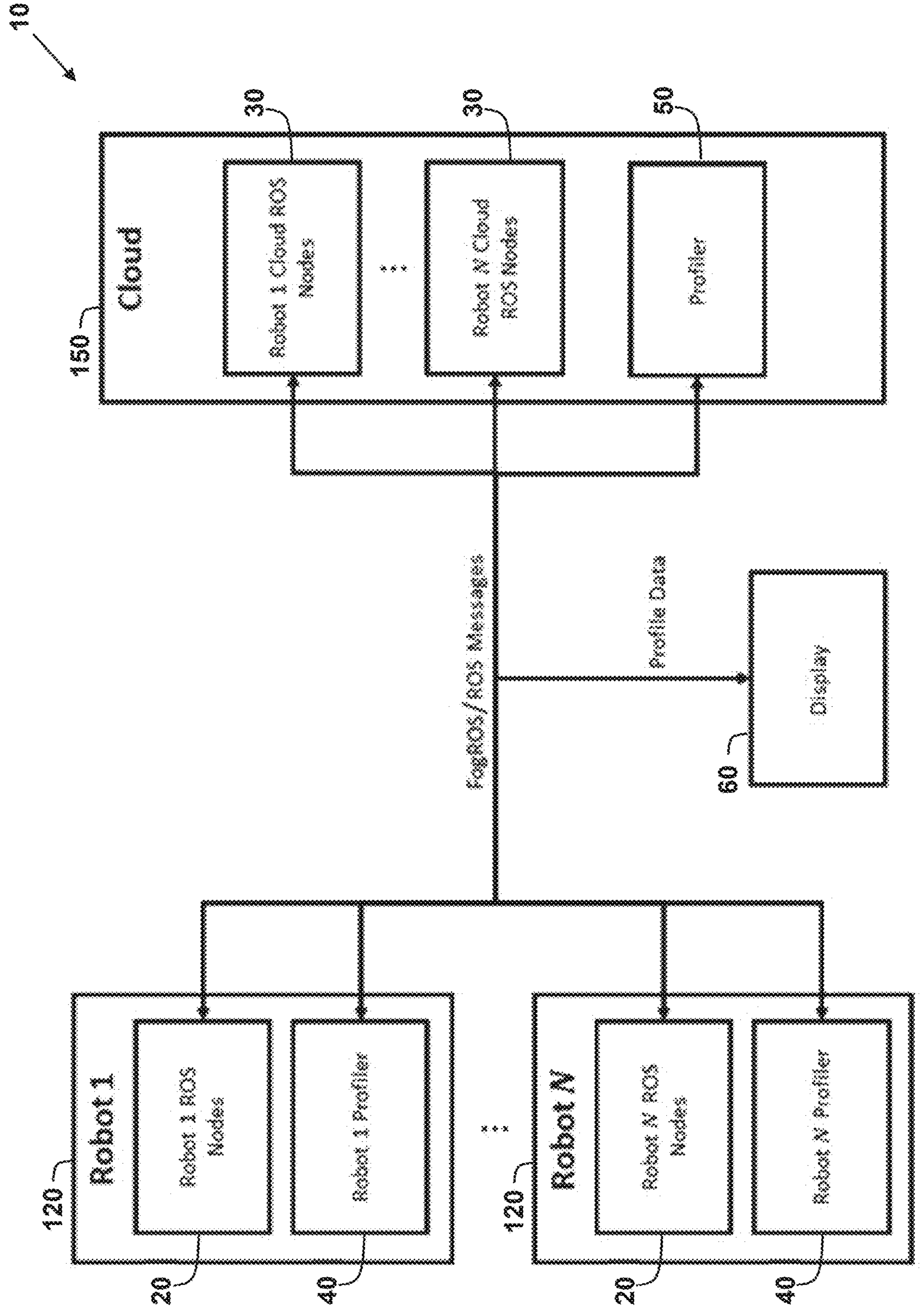
FIG. 1 summarizes components and operations of a mobile robot system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Overview

With reference to FIG. 1, components and operations of a mobile robot system 10 are summarized. The mobile robot system 10 includes one or more mobile robots 120, each configured to perform a task in an environment. The mobile robots 120 advantageously leverage cloud computing or fog computing to dynamically offload computation tasks. To these ends, the mobile robot system 10 further includes a cloud system 150. The cloud system 150 may comprise any computing device that is not physically located on the robot.

It should be appreciated that cloud computing refers to accessing and utilizing remote computing and data storage devices. Similarly, fog computing refers to accessing and utilizing both cloud and closer computing devices, e.g., network gateways, servers in the same facility as the robot, desktops on a local network, etc. Because the mobile robots 120 often have limited on-board computing resources, cloud or fog computing is used to extend these capabilities.

In at least some embodiments, the operating procedures of the mobile robots 120 are implemented using a robotics middleware. The robotics middleware provides a set of software libraries for enabling communication between mobile robots and other computing devices. Robots and computing devices communicating via the robotics middleware do not need to have the same hardware because the robotics middleware abstracts data from a hardware-specific format into robotics middleware messages. Using the robotics middleware, the operating procedures of the mobile robots are modularly organized into a plurality of discrete processes, referred to herein as robot nodes 20. Each robot node 20 performs a respective function of the mobile robot 120 that executes computational tasks on request and sends back a result.

The robot nodes 20 communicate with one another by sending middleware messages with a predetermined format (e.g., in a format defined by the robotics middleware and defined prior to the sending or receiving). Using such messages, the different mobile robots 120 can likewise communicate with one another, communicate with the cloud system 150, or communicate with any other computing device. In some embodiments, each robot node 20 also operates as one or both of (i) a publisher that publishes data on topics and (ii) a subscriber that receives data from topics. As used herein, "topics" refer to communication channels for sending or receiving messages to or from any device that is publishing on or subscribed to the topic.

To facilitate the performance of offloaded computation tasks by the cloud system 150, the cloud system 150 implements copies of the robot nodes 20, referred to herein as robot cloud nodes 30, which are configured to execute the same computational tasks but with more abundant computing resources. The robot cloud nodes 30 are implemented with the same robotics middleware as that of the robot nodes 20. The cloud system 150 executes computational tasks that are dynamically offloaded by a respective robot node 20 using the corresponding robot cloud node 30 that is a copy of the respective robot node 20. The mobile robots 120 and the cloud system 150 utilize a middleware-compatible message passing system to pass middleware messages across a network (e.g., the Internet), with possible intermediate conversions.

In at least one embodiment, the robotics middleware implemented by the mobile robot 120 and the cloud system 150 is the Robot Operating System (ROS). In such embodiments, the robot nodes 20 and the robot cloud nodes 30 are ROS nodes and the middleware messages include ROS messages or FogROS messages. It should be appreciated that FogROS is a software library for connecting local ROS nodes to cloud-based ROS nodes. With ROS and FogROS, the mobile robots 120 can communicate with each other and with the cloud system 150, as well as with any other local computing devices or cloud systems. ROS messages are passed between the mobile robots 120 using the default ROS message passing mechanisms. ROS messages are passed to the cloud via FogROS. It should be appreciated that any version of ROS and any version of FogROS might be adopted as the robotics middleware for the mobile robot system 10. Additionally, it should be appreciated that other robotics middleware can likewise be adopted and the disclosure should not be understood to be limited to ROS or ROS-related middleware solutions.

With continued reference to FIG. 1, each mobile robot 120 includes a robot profiler 40. The robot profilers 40 are executed by the respective mobile robots 120 to collect profile data including CPU utilization, network latency, and the like for the respective mobile robots 120. Additionally, the cloud system 150 similarly includes a profiler 50 that is executed to collect additional profile data including, for example CPU utilization, GPU utilization, network utilization, offloaded computation cost per hour, and the like. The profilers 40, 50 transmit profile messages to share the collected profile data with other devices in the mobile robot system 150. In some embodiments, the profile messages take the form of middleware messages, in the form discussed above.

Based on the profile data collected by the profilers 40, 50, the robot nodes 20 of the mobile robots dynamically determine whether to perform computation tasks locally or to offload the computation tasks to the cloud system 150. The robot nodes 20 of each respective mobile robot 120 make this determination based on several criteria, such as round-trip latency, framerate, battery conservation, CPU utilization, cloud cost, etc., which are evaluated based on the profile data collected by the profilers 40, 50. If the processing resources of the mobile robot 120 are near maximum utilization, the battery power of the mobile robot 120 is low, and there is a good network connection with the cloud system 150, the computation task may be scheduled in the cloud. Likewise, if network connectivity becomes poor, the cloud system 150 takes too long to respond, or the cloud costs exceed a budget, the computation task may be scheduled to be performed locally.

In this way, the mobile robots 120 are empowered to offload computation tasks to the cloud system 150, or to any other offboard computing devices. Moreover, it should be appreciated that the offloading is dynamic, meaning execution of computation tasks can be switched between local execution by the mobile robot 120 or remote execution by the cloud system 150 at any time, depending on timing requirements, energy requirements, or any other requirements. Thus, dynamic offloading enables the mobile robots 120 to be robust to varying network conditions, while at the same time taking advantage of off-board computing resources when possible.

In some embodiments, the cloud system 150 is configured to allocate computation resources, e.g., GPUs, CPUs, virtual machines, elastic compute instances, in a dynamic manner. Particularly, computation resources are automatically allocated and deallocated based on one or more of the following factors: the quality of service (QOS) requested by the mobile robots 120 connected to the cloud system 150, the number of mobile robots 120 currently connected to the cloud system 150, the amount of processing requested by the mobile robots 120, and a desired budget of cloud computing costs.

In some embodiments, the mobile robot system 10 further includes a display screen 60. The display screen 60 is accompanied by a network-connected computing device (not shown) or may be directly integrated into one or more of the mobile robots 120. In any case, the computing device accompanying the display screen 60 receives profile messages from the profilers 40, 50 and operates the display screen 60 to display profile data collected by the profilers 40, 50. In some embodiments, the computing device accompanying the display screen 60 implements one or more middleware nodes (e.g., ROS nodes), as similarly discussed with respect to the robot nodes 20.

Mobile Robot

Figure 2A:
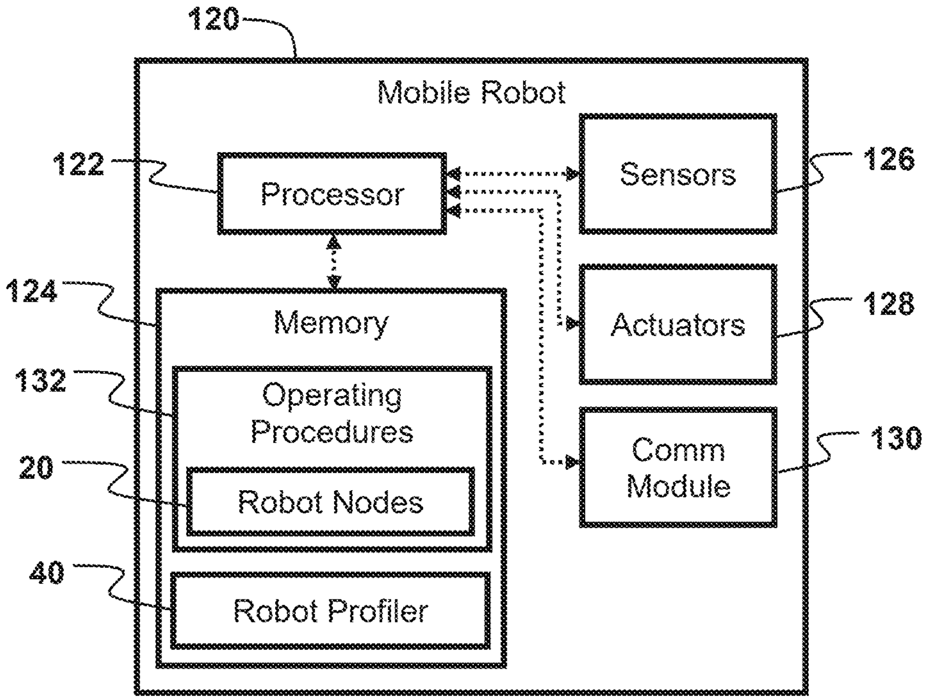
FIG. 2A shows an exemplary embodiment of one of the mobile robots.

FIG. 2A shows an exemplary embodiment of one of the mobile robots 120. In the illustrated embodiment, the mobile robot 120 comprises, for example, a processor 122, a memory 124, one or more sensors 126, one or more actuators 128, and at least one network communications module 130. It will be appreciated that the illustrated embodiment of the mobile robot 120 is only one exemplary embodiment and is merely representative of any of various manners or configurations of mobile robots that autonomously navigate an environment to perform a task.

The processor 122 is configured to execute instructions to operate the mobile robot 120 to enable the features, functionality, characteristics and/or the like as described herein. To this end, the processor 122 is operably connected to the memory 124, the one or more sensors 126, and the one or more actuators 128. The processor 122 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 122 may include a system with a central processing unit, graphics processing units, multiple processing units, dedicated circuitry for achieving functionality, programmable logic, or other processing systems.

The memory 124 is configured to store data and program instructions that, when executed by the processor 122, enable the mobile robot 120 to perform various operations described herein. The memory 124 may be any type of device capable of storing information accessible by the processor 122, such as a memory card, ROM, RAM, hard drives, discs, flash memory, or any of various other computer-readable media serving as data storage devices, as will be recognized by those of ordinary skill in the art. As discussed in further detail below, the processor 122 is configured to execute program instructions of an operating procedure 132, which is stored in the memory 124, to navigate the environment to perform a task. In at least one embodiment, the operating procedure 132 is implemented using middleware in the form of one or more robot nodes 20. Additionally, the processor 122 is configured to execute program instructions of the robot profiler 40 to collect profile data including CPU utilization, network latency, and the like for the mobile robot 120.

The one or more sensors 126 may comprise a variety of different sensors. In some embodiments, the sensors 126 include sensors configured to measure one or more accelerations, rotational rates, and/or orientations of the mobile robot 120. In one embodiment, the sensors 126 include one or more accelerometers configured to measure linear accelerations of the mobile robot 120 along one or more axes (e.g., roll, pitch, and yaw axes), or one or more gyroscopes configured to measure rotational rates of the mobile robot 120 along one or more axes (e.g., roll, pitch, and yaw axes), and/or an inertial measurement unit configured to measure all of the above.

In at least some embodiments, the sensors 126 include a light sensor (e.g., LIDAR or any other time of flight or structured light-based sensor), configured to emit measurement light (e.g., lasers) and receive the measurement light after it has reflected throughout the environment. In time-of-flight based embodiments, the processor 122 is configured to calculate times of flight and/or return times for the measurement light. Based on the calculated times of flight and/or return times, the processor 122 may for example generate map data, for example in the form of a point cloud. In structured light-based embodiments, the processor 122 applies an algorithm to extract a 3D profile of surfaces onto which the structured light is projected (e.g., based on a fringe pattern generated on a surface).

In some embodiments, the sensors 126 include, as an alternative to the light sensor or in addition thereto, one or more cameras configured to capture a plurality of images of the environment as the mobile robot 120 navigates through the environment. The camera(s) generate image frames of the environment, each of which comprises a two-dimensional array of pixels. Each pixel has corresponding photometric information (color, intensity, and/or brightness). In some embodiments, the camera(s) are configured to generate RGB-D images in which each pixel has corresponding photometric information and geometric information (depth and/or distance). In such embodiments, the camera(s) may take the form of an RGB camera that operates in association with a LIDAR or IR sensor, in particular a LIDAR camera or IR camera, configured to provide both photometric information and geometric information. The LIDAR camera or IR camera may be separate from or directly integrated with the RGB camera. Alternatively, or in addition, the camera may comprise two RGB cameras configured to capture stereoscopic images, from which depth and/or distance information can be derived. Based on RGB-D images captured as the mobile robot 120 navigates the environment, the mobile robot 120 may implement visual and/or visual-inertial odometry methods such as simultaneous localization and mapping (SLAM) techniques.

The one or more actuators 128 at least include motors of a locomotion system that, for example, drive a set of wheels to cause the mobile robot 120 to move throughout the environment to perform the task. Additionally, in some embodiments, the one or more actuators 128 include a vacuum suction system configured to vacuum a floor surface as the mobile robot 120 navigates through the environment. Mobile robots 120 that perform other tasks in the environment may, of course, include different types of actuators 128 that are suitable to other tasks.

The network communications module 130 may comprise one or more transceivers, modems, processors, memories, oscillators, antennas, or other hardware conventionally included in a communications module to enable communications with various other devices, at least including the cloud system 150 and/or the other mobile robots 120. Particularly, the network communications module 130 generally includes a Wi-Fi module configured to enable communication with a Wi-Fi network and/or Wi-Fi router (not shown). Additionally, the network communications module 130 may include a Bluetooth® module (not shown) configured to enable communication with a mobile device (not shown). Finally, the network communications module 130 may include one or more cellular modems configured to communicate with wireless telephony networks.

The mobile robot 120 may also include a respective battery or other power source (not shown) configured to power the various components within the mobile robot 120. In one embodiment, the battery of the mobile robot 120 is a rechargeable battery configured to be charged when the mobile robot 120 is connected to a base station that is configured for use with the mobile robot 120.

Cloud System

As referenced above, the mobile robots 120 are in communication with a cloud system 150. Particularly, the cloud system 150 is configured to perform computational tasks that have been dynamically offloaded by the mobile robots 120.

Figure 2B:
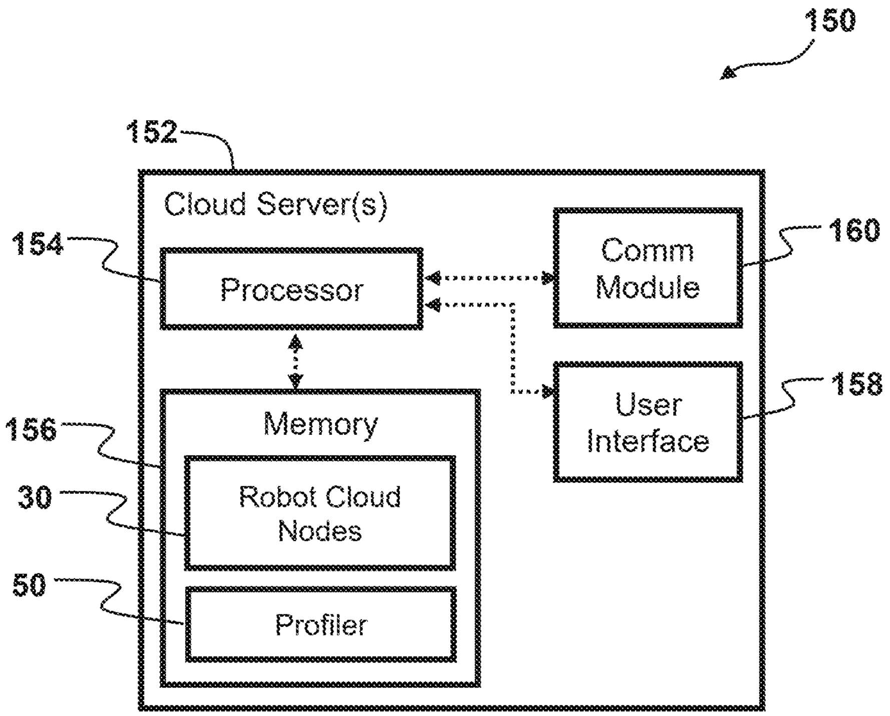
FIG. 2B shows an exemplary embodiment of the cloud system.

FIG. 2B shows an exemplary embodiment of the cloud system 150. The cloud system 150 comprises one or more cloud servers 152. The cloud servers 152 may include servers configured to serve a variety of functions for the cloud system 150, including web servers or application servers depending on the features provided by the cloud system 150, but at least include one or more cloud servers

152 for the dynamic offloading of computation tasks from the mobile robots 120. Each cloud server 152 includes, for example, a processor 154, a memory 156, a user interface 158, and a network communications module 160. It will be appreciated that the illustrated embodiment of the cloud servers 152 is only one exemplary embodiment of a cloud server 152 and is merely representative of any of various manners or configurations of a personal computer, server, or any other data processing system that is operative in the manner set forth herein.

The processor 154 is configured to execute instructions to operate the cloud server 152 to enable the features, functionality, characteristics and/or the like as described herein. To this end, the processor 154 is operably connected to the memory 156, the user interface 158, and the network communications module 160. The processor 154 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 154 may include a system with a central processing unit, graphics processing units, multiple processing units, dedicated circuitry for achieving functionality, programmable logic, or other processing systems.

The memory 156 is configured to store program instructions that, when executed by the processor 154, enable the cloud server 152 to perform various operations described herein. The memory 156 may be any type of device or combination of devices capable of storing information accessible by the processor 154, such as memory cards, ROM, RAM, hard drives, discs, flash memory, or any of various other computer-readable media recognized by those of ordinary skill in the art. As discussed in further detail below, the processor 154 is configured to execute program instructions stored in the memory 156, to perform computational tasks that are dynamically offloaded by the mobile robots 120. More particularly, the memory 156 stores program instructions corresponding to the robot cloud nodes 30, implemented using the middleware, as discussed above. The processor 154 performs computational tasks that are dynamically offloaded by a respective robot node 20 using the corresponding robot cloud node 30 that is a copy of the respective robot node 20. Additionally, the processor 122 is configured to execute program instructions of the profiler 50 to collect additional profile data including, for example CPU utilization, GPU utilization, network utilization, offloaded computation cost per hour, and the like for the cloud system 150.

The cloud server 152 may be operated locally or remotely by an administrator. To facilitate local operation, the cloud server 152 may include the user interface 158. In at least one embodiment, the user interface 158 may suitably include an LCD display screen or the like, a mouse or other pointing device, a keyboard or other keypad, speakers, and a microphone, as will be recognized by those of ordinary skill in the art. Alternatively, in some embodiments, an administrator may operate the cloud server 152 remotely from another computing device which is in communication therewith via the network communications module 160 and has an analogous user interface.

The network communications module 160 provides an interface that allows for communication with any of various devices, at least including the mobile robots 120. In particular, the network communications module 160 may include a local area network port that allows for communication with any of various local computers housed in the same or nearby facility. Generally, the cloud server 152 communicates with remote computers over the Internet via a separate modem and/or router of the local area network. Alternatively, the network communications module 160 may further include a wide area network port that allows for communications over the Internet. In one embodiment, the network communications module 160 is equipped with a Wi-Fi transceiver or other wireless communications device. Accordingly, it will be appreciated that communications with the cloud server 152 may occur via wired communications or via the wireless communications. Communications may be accomplished using any of various known communications protocols.

Methods for Dynamically Offloading Computation Tasks from a Mobile Robot

A variety of methods and processes are described below for dynamically offloading computation tasks from a mobile robot. In these descriptions, statements that a method, processor, and/or system is performing a task or function refers to a controller or processor (e.g., the processor 154 of the cloud server 152 or the processor 122 of the mobile robot 120) executing programmed instructions stored in non-transitory computer readable storage media (e.g., the memory 156 of the cloud server 152 or the memory 124 of the mobile robot 120) operatively connected to the controller or processor to manipulate data or to operate one or more components in the cloud server 152 or the mobile robot 120 to perform the task or function. Additionally, the steps of the methods may be performed in any feasible chronological order, regardless of the order shown in the figures or the order in which the steps are described.

Figure 3:
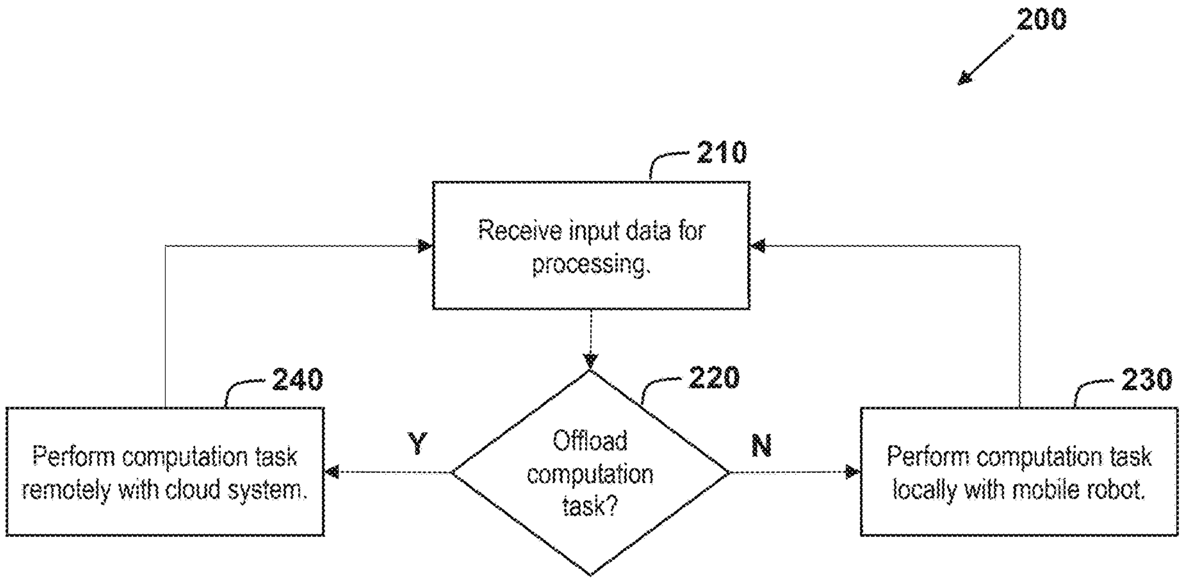
FIG. 3 shows a flow diagram for a method for operating a mobile robot to dynamically offload computation tasks to a cloud system.

FIG. 3 shows a flow diagram for a method 200 for operating a mobile robot to dynamically offload computation tasks to a cloud system. The method 200 advantageously enables a mobile robot 120 to switch between local execution by the mobile robot 120 or remote execution by the cloud system 150 at any time, depending on timing requirements, energy requirements, or any other requirements. Thus, the method 200 enables the mobile robots 120 to be robust to varying network conditions, while at the same time taking advantage of off-board computing resources when possible.

The method 200 begins with receiving input data for processing (block 210). Particularly, the processor 122 of the mobile robot 120 receives input data that is to be processed. In at least some embodiments, the input data is sensor data captured by one or more of the sensors 126 of the mobile robot 120. In one example, the sensor data includes an image captured by a camera of the sensors 126 of the mobile robot 120. In some embodiments, the processor 122 executes program instructions of corresponding robot nodes 20 to operate the one or more sensors 126 to capture sensor data. Next, the processor 122 executes program instructions of the corresponding robot nodes 20 to publish the sensor data to a corresponding topic, e.g., by sending a suitably formatted middleware message from the corresponding robot nodes 20.

In further embodiments, the input data is a user input identifying a task that is to be performed by the mobile robot. Particularly, in some embodiments, the mobile robot 120 includes a user interface or communicates with a mobile device (not shown) having a mobile robot application that acts as a user interface. Via the user interface, the processor 122 of the mobile robot 120 receives user inputs that, at least in some cases, specify a task that is to be performed by the mobile robot 120, which involves one or more computation tasks.

The method 200 continues with determining whether to offload a computation task that is to be performed with respect to the input data (block 220). Particularly, the processor 122 identifies what computation tasks are to be performed based on the received input data or as a result from receiving the input data. Next, the processor 122, or the processor 154 of the cloud system 150, determines whether the computation task should be offloaded to the cloud system 150 or not. In some embodiments, the processor 122 or the processor 154 breaks the computation task down into small time slices or may have a mechanism for interrupting the processing, such that the computation task can be transitioned between local or remote performance at any time.

As noted above, in some embodiments, the input data is sensor data that is published to a corresponding topic by the corresponding robot node(s) 20, e.g., by sending a suitably formatted middleware message. One or more of the other robot node(s) 20 of the mobile robot 120 may subscribe to the middleware topic and/or otherwise receive the sensor data or other input data. In each case, the program instructions of those other robot node(s) 20 are configured to perform a computation task with respect to the sensor data or other input data.

In one embodiment, the robot nodes 20 of the mobile robot 120 include a robot node 20 configured to receive an image of the environment captured by a camera of the mobile robot 120 and to detect an object located in the image, e.g., determine a bounding box around the object and/or classify the object. Such a robot node 20 of the mobile robot 120 may subscribe to a middleware topic to which images are published by another of the robot nodes 20. Thus, the processor 122 can identify that an object detection task is to be performed with respect to the image.

In one embodiment, the robot nodes 20 of the mobile robot 120 includes a robot node 20 configured to receive sensor data, such as an image or LIDAR data, captured in the environment and to localize a position or orientation of the mobile robot 120 in the environment. Such a robot node 20 of the mobile robot 120 may subscribe to a middleware topic to which such sensor data are published by one or more other robot nodes 20. Thus, the processor 122 can identify that a robot localization task is to be performed with respect to the sensor data.

In one embodiment, the robot nodes 20 of the mobile robot 120 include a robot node 20 configured to receive sensor data or map data regarding the environment and/or input data identifying a task to be performed in the environment, and to determine a trajectory with which the mobile robot 120 is to navigate the environment. Such a robot node 20 of the mobile robot 120 may subscribe to a middleware topic to which such sensor data or input data are published by one or more other robot nodes 20. Thus, the processor 122 can identify that a robot motion planning task is to be performed with respect to the sensor data or other input data.

Once the computation task(s) that are to be performed with respect to input data are identified, the system 10 determines whether each computation task should be offloaded to the cloud system 150 or not. The determination of whether a computation task should be offloaded to the cloud system 150 or not can take place locally by the processor 122 of the mobile robot 120 or by the processor 154 in the cloud by the cloud system 150. In the case that the cloud system determines whether a computation task should be offloaded to the cloud system 150, the cloud system 150 transmits and the mobile robot 120 receives a message indicating whether the computation task should be offloaded to the cloud system 150, for example with a binary flag in the message.

To enable an informed decision as to whether the computation task should be offloaded to the cloud system 150 or not, the profilers 40, 50 of the mobile robot system 10 collect a plurality of profile data. Particularly, the processor 122 of the mobile robot 120 executes program instructions of the robot profiler 40 to collect profile data characterizing possible performance of the computation task by the processor 122. Such profile data collected using the robot profiler 40 includes, for example, network latencies, latencies over middleware topics or of middleware messages, processing times, framerates over middleware topics or of middleware messages, computation resource consumption such as CPU utilization, GPU utilization, system memory utilization, and video memory utilization, and computation costs such as battery/energy consumption.

Likewise, the processor 154 of the cloud system 150 executes program instructions of the profiler 50 to collect profile data characterizing possible performance of the computation task by the processor 154. Such profile data collected using the profiler 50 includes, for example, network latencies, network utilization, latencies over middleware topics or of middleware messages, processing times, framerates over middleware topics or of middleware messages, computation resource consumption such as CPU utilization, GPU utilization, system memory utilization, and video memory utilization, and computation costs such as energy consumption and financial cost (e.g., dollar cost per hour).

With continued reference to FIG. 3, based on the collected profile data, the processor 122 of the mobile robot 120 or processor 154 of the cloud system 150 determines whether the computation task should be offloaded to the cloud system 150 or not. In at least some embodiments, the processor 122 or the processor 154 determines whether the computation task is to be offloaded based on at least one optimization criteria. Such optimization criteria may include, for example, minimizing total round-trip computation time of the computation task, minimizing computation costs of the computation task, and maximizing battery life of the mobile robot 120. The processor 122 or the processor 154 determines an optimal decision, given the optimization criteria, using an appropriate optimization procedure for the specific set of criteria selected, e.g., integer programming.

In one example, the processor 122 receives a stream of images, e.g., for detecting obstacles in an image. Every time an image is acquired from the camera, the processor 122 or the processor 154 will determine whether to offload the obstacle detection task or not. For example, if the past recent average round-trip processing time on the cloud has been faster than the robot, the scheduler will decide to offload. Once processing of one image is done, the decision to offload processing of the second image takes place, and so on. In some embodiments, to ensure that there is an accurate estimate of the processing time for both the cloud system 150 and for the mobile robot 120, the processor 122 or the processor 154 could periodically make a suboptimal decision to keep an updated estimate of the processing times. In other words, the computation tasks is at least periodically performed on the mobile robot 120 and at least periodically performed on the cloud system 150, so that processing times or other profile data is kept up to date and accurate.

Figure 4:
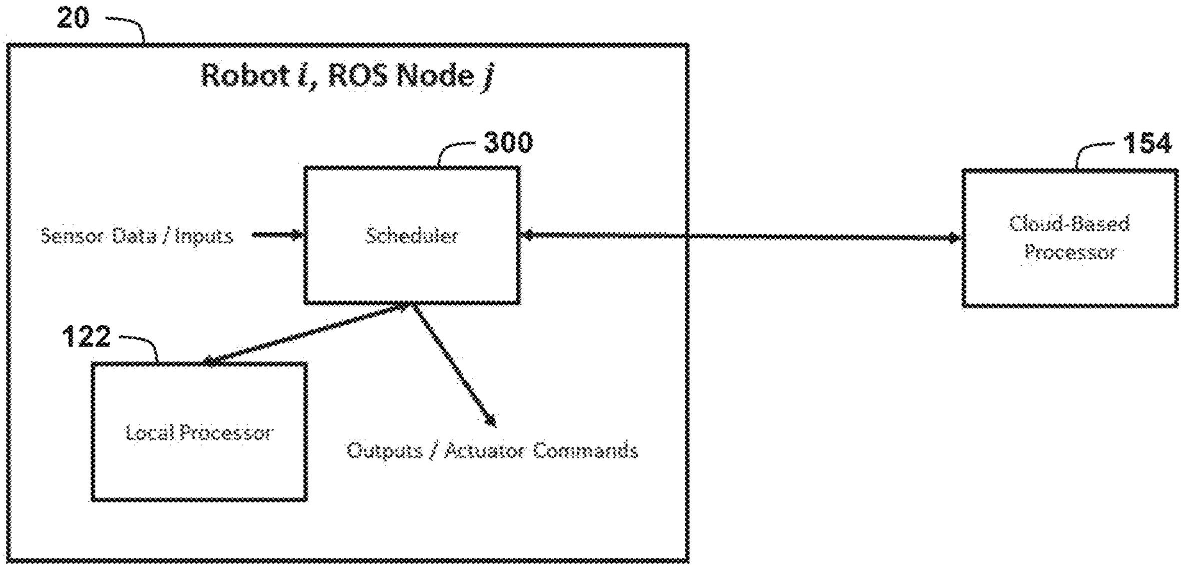
FIG. 4 shows an example of dynamic offloading with a local robot node, in which the decision to offload is made by a scheduler of the robot node.

FIG. 4 shows an example of dynamic offloading with a local robot node 20, in which the decision to offload is made by a scheduler of the robot node 20. Particularly, in at least some embodiments, the mobile robot 120 and/or each robot node 20 implemented thereon includes program instructions corresponding to a scheduler 300. The processor 122 executes the scheduler 300 to determine whether the computation task should be offloaded to the cloud system 150 or not. The scheduler 300 receives inputs, often in the form of sensor data, e.g., camera images, indicating that a computation task has been requested. The scheduler 300 optimizes a number of criteria to decide whether to offload. The decision of the scheduler 300 may rely on the profile data collected by the profilers 40, 50. The scheduler 300 may break the task down into small time slices or it may have a mechanism for interrupting the local and remote processing. Once the computation task is completed, the result is output, often in the form of robot actuator commands.

In some embodiments, the processor 122 or the processor 154 determines whether the computation task should be offloaded in part based on whether the computation task relates to performance of a task in the environment requiring coordination between the mobile robot 120 and at least one other mobile robot 120. Particularly, for multi-robot coordination tasks, it is often necessary for a state of other mobile robots 120 to be known when performing certain computation tasks, such as motion planning. However, it should be appreciated that the cloud system 150 may have a more accurate and up-to-date understanding of the actual state of each mobile robot 120 involved in the multi-robot coordination task. Conversely, the individual mobile robots 120 involved in the multi-robot coordination task may have a limited and estimated understanding of the actual state of each other mobile robot 120. In this way, the cloud system 150 can perform certain kinds of computation tasks relating to a multi-robot coordination task more effectively than can the individual mobile robots 120.

Accordingly, in some embodiments, the processor 122 or the processor 154 determines whether the computation task should be offloaded in part depending on a desired or required level of coordination between other mobile robots 120. In one example, in response to the desired/required level of coordination between other mobile robots 120 exceeding a threshold level, the processor 122 or the processor 154 determines that the computation task should be offloaded. In another embodiment, in response to a number of mobile robots located near each other (e.g., within a predetermined radius) exceeding a predetermined threshold, the processor 122 or the processor 154 determines that the computation task should be offloaded, since a high level of coordination would be required. In the case that local performance by the mobile robot 120 is nonetheless chosen, in some embodiments, the cloud system 150 transmits the latest states of the other mobile robots 120 to each mobile robot 120 involved in the multi-robot coordination task.

In at least some embodiments, the collected profile data are displayed on the display screen 60. Particularly, it should be appreciated that the profilers 40, 50 are distributed amongst the mobile robots 120 and the cloud system. In at least one embodiment, a network-connected computing device accompanying the display screen 60 receives profile messages from the profilers 40, 50 and operates the display screen 60 to display profile data collected by the profilers 40, 50. In some embodiments, the computing device accompanying the display screen 60 implements one or more middleware nodes (e.g., ROS nodes), as similarly discussed with respect to the robot nodes 20.

Figure 5A:
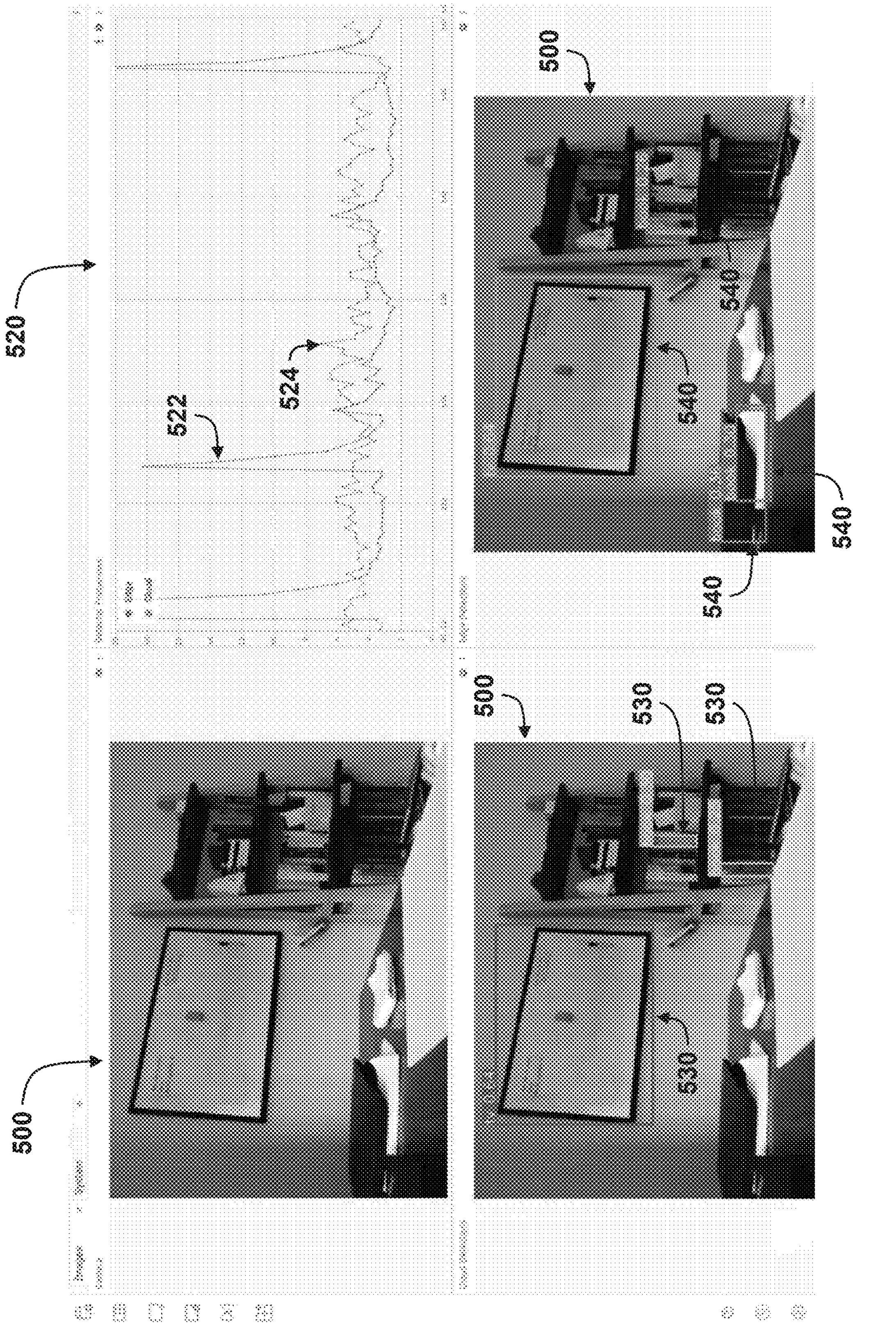
FIGS. 5A and 5B show exemplary graphical user interfaces displayed on a display screen for representing profile data collected in the mobile robot system.
Figure 5B:
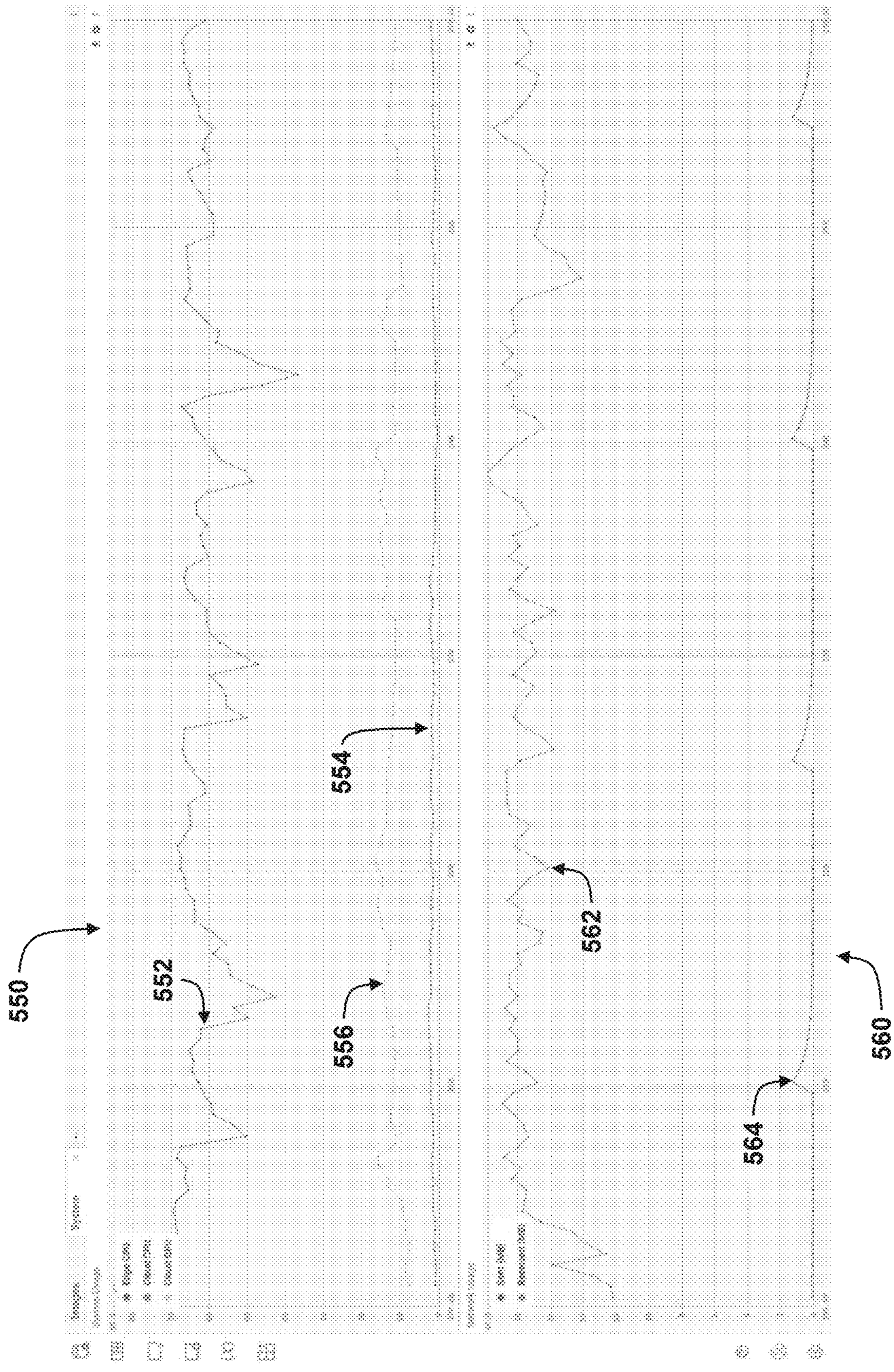

FIGS. 5A and 5B show exemplary graphical user interfaces displayed on the display screen 60 for representing profile data collected in the mobile robot system 10. In one example, the computing device accompanying the display screen 60 implements Foxglove Studio to provide a graphical user interface for displaying and interacting with the profile data. In the top-left of FIG. 5A, an image 500 is shown that has been captured by a mobile robot 120 of the mobile robot system 10 and with respect to which object detection is to be performed. In the top-right of FIG. 5A, a data plot 520 is shown that compares an object detection frame rate 522 of the mobile robot 120 with an object detection frame rate 524 of the cloud system 150. In the bottom-left of FIG. 5A, the image 500 is shown with bounding boxes 530 identifying objects detected by the cloud system 150. In the bottom-right of FIG. 5A, the image 500 is shown with bounding boxes 540 identifying objects detected by the mobile robot 120. In the top of FIG. 5B, a data plot 550 is shown that compares a CPU utilization 552 of the mobile robot 120, a CPU utilization 554 of the cloud system 150, and a GPU utilization 556 of the cloud system 150. In the bottom of FIG. 5B, a data plot 560 is shown that compares a number of megabytes of data 562 sent by the mobile robot 120 with a number of megabytes of data 564 received by the mobile robot 120.

Alternatively, or in addition to displaying the profile data on the display screen 60, in some embodiments, the system 10 is configured to store the profile data in one or more log files, e.g., in the memory 156 of the cloud system 150 or in the memory 124 of the mobile robots 120. In some embodiments, the system 10 is configured to upload the profile data to a further remote server and/or transmit the profile data to a web server to be viewed from any remote device.

Returning to FIG. 3, if the system determines not to offload the computation task, then the method 200 continues with performing the computation task locally with the mobile robot (block 230). Particularly, in response to determining that the computation task is not to be offloaded, the processor 122 determines the output of the computation task. In some embodiments, the processor 122 executes program instructions of corresponding robot node(s) 20 to determine the output of the computation task. In one example, the computation task includes detecting an object in an image. Thus, the output of the computation task may comprise, for example, a bounding box around the object in the image and/or a classification of the object in the image. In another example, the computation task includes determining a position or orientation of the mobile robot 120 in the environment. In yet another example, the computation task includes determining a trajectory with which the mobile robot is to navigate the environment. In a further example, the computation task includes generating output commands for the actuators 128 to cause the mobile robot 120 to perform a task in the environment.

Otherwise, if the system determines to offload the computation task, then the method 200 continues with performing the computation task remotely with the cloud system (block 240). Particularly, the processor 122 operates the network communication module 130 to transmit an offload message to the cloud system 150, the offload message including the input data and an indication of the computation task that is to be performed with respect to the input data. In at least some embodiments, the processor 122 executes program instructions of corresponding robot node(s) 20 to transmit the offload message in the form of a middleware message (e.g., a ROS message). The processor 154 of the cloud system 150 operates the network communications module 160 to receive the message from the mobile robot 120. Next, the processor 154 determines the output of the computation task. In some embodiments, the processor 154 executes program instructions of corresponding robot cloud node(s) 30 to determine the output of the computation task. Finally, the processor 154 operates the network communications module 160 to transmit a computation output message to the mobile robot 120. In some embodiments, the processor 154 executes program instructions of corresponding robot cloud node(s) 30 to transmit the computation output message in the form of a middleware message (e.g., a ROS message).

Figure 6:
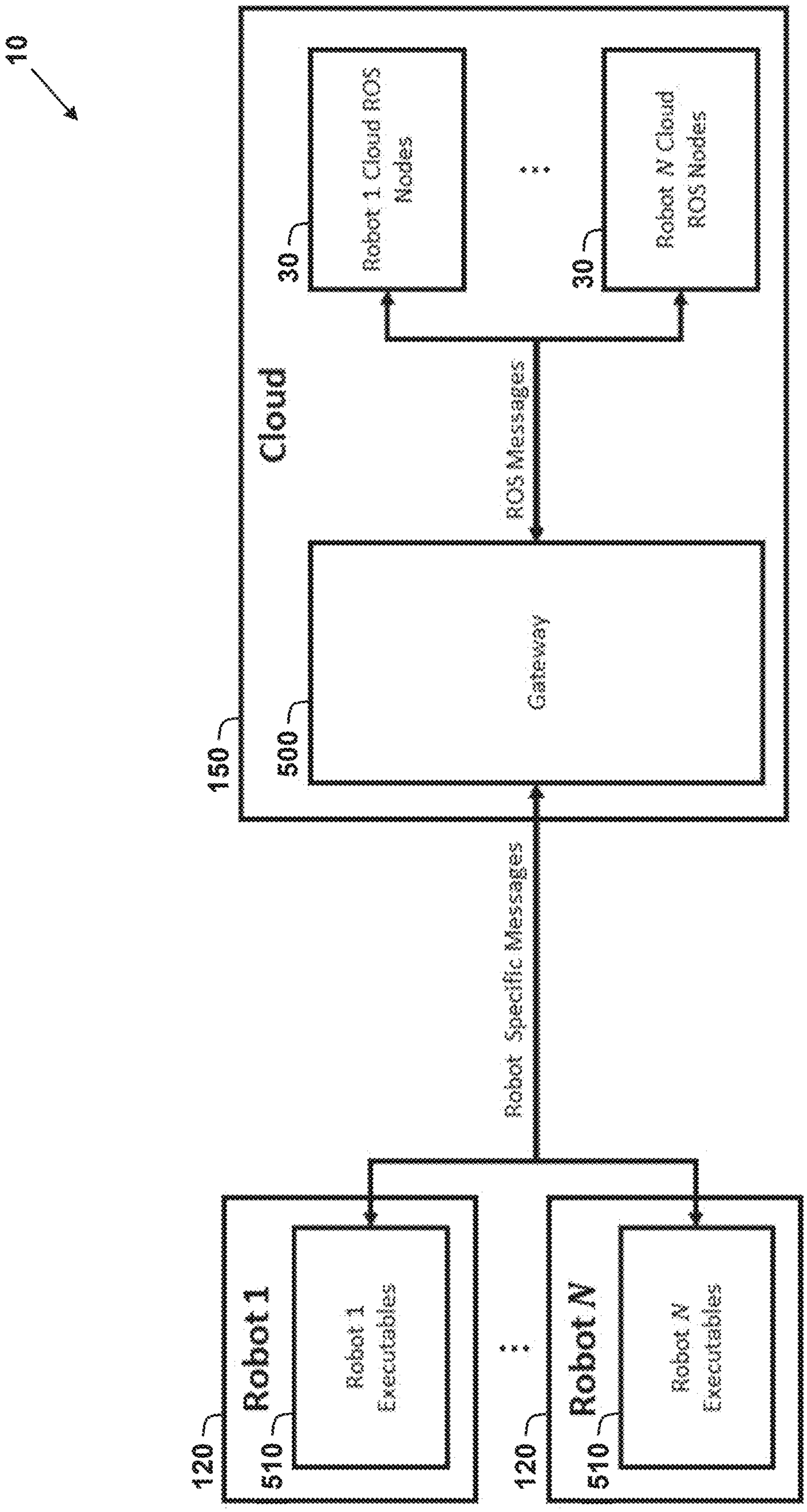
FIG. 6 shows one embodiment of the mobile robot system that incorporates a gateway.

In some embodiments, the cloud system 150 includes a gateway for communication with mobile robots 120 that are only capable of communicating via manufacturer-specific message formats, rather than using middleware messages (e.g., ROS messages). FIG. 6 shows one embodiment of the mobile robot system 10 that incorporates a gateway 500. The gateway 500 operates as a hardware abstraction layer by translating messages between manufacturer-specific (or robot-type specific) message formats of at least some of the mobile robots 120 and the middleware message format used by the cloud system 150. Particularly, the mobile robots 120 send messages to the cloud system 150, e.g., for the purpose of offloading a computation task, as discussed above. The messages are sent having a manufacturer-specific or robot-type specific message format, rather than the middleware message format (e.g., ROS). The cloud system 150 receives the messages from the mobile robots 120 and the processor 154 executes program instructions of the gateway 500 to convert the received messages into middleware messages having the middleware message format. Conversely, the processor 154 executes program instructions of the robot cloud nodes 30 to generate middleware messages having the middleware message format. Next, the processor 154 executes program instructions of the gateway 500 to convert the middleware messages into messages having the manufacturer-specific or robot-type specific message format. In this way, mobile robots 120 from different manufacturers can offload computation without any updates being required to the executables 510 on the mobile robots 120 to specifically adopt the middleware architecture adopted by the rest of the mobile robot system 10.

In at least some embodiments, the cloud system 150 is configured to perform the computation task on behalf of the mobile robot 120 with the aid of a virtual robot (or 'digital twin') that resides in the cloud system 150 and communicates with the real mobile robot 120. The virtual robot is a digital description of the hardware, memories, and/or software of the mobile robots 120. In the example of FIG. 1, the robot cloud nodes 30 can be considered virtual robots because they contain a copy of some of the software of the real mobile robot 120. The processor 154 executes a copy of the program instructions of the real mobile robot 120 to determine the output of a computation task.

Additionally, the virtual robots may extend beyond merely having copies of some of the software of the real mobile robot 120, and may further include virtual hardware models and real-time state information characterizing a current state of the real mobile robot 120. Accordingly, in at least some embodiments, the processor 154 determines the output of a computation task based on the input data, the current state of the mobile robot 120, and/or a virtual hardware model of the mobile robot 120. Particularly, in some embodiments, the processor 154 of the cloud system 150 simulates the real mobile robot 120 using a virtual hardware model. The virtual robot's hardware can be updated in response to real-world changes to the robot's hardware. In some embodiments, the processor 154 manipulates the virtual hardware models in a physics-based simulation to predict the result of actions hypothetically taken by the real robot or by the surrounding environment. For example, the processor 154 may utilize the physics-based simulation in a motion planning task to determine a suitable trajectory for the mobile robot 120. Simulation enables safe exploration of different actions to achieve a desirable outcome.

Figure 7:
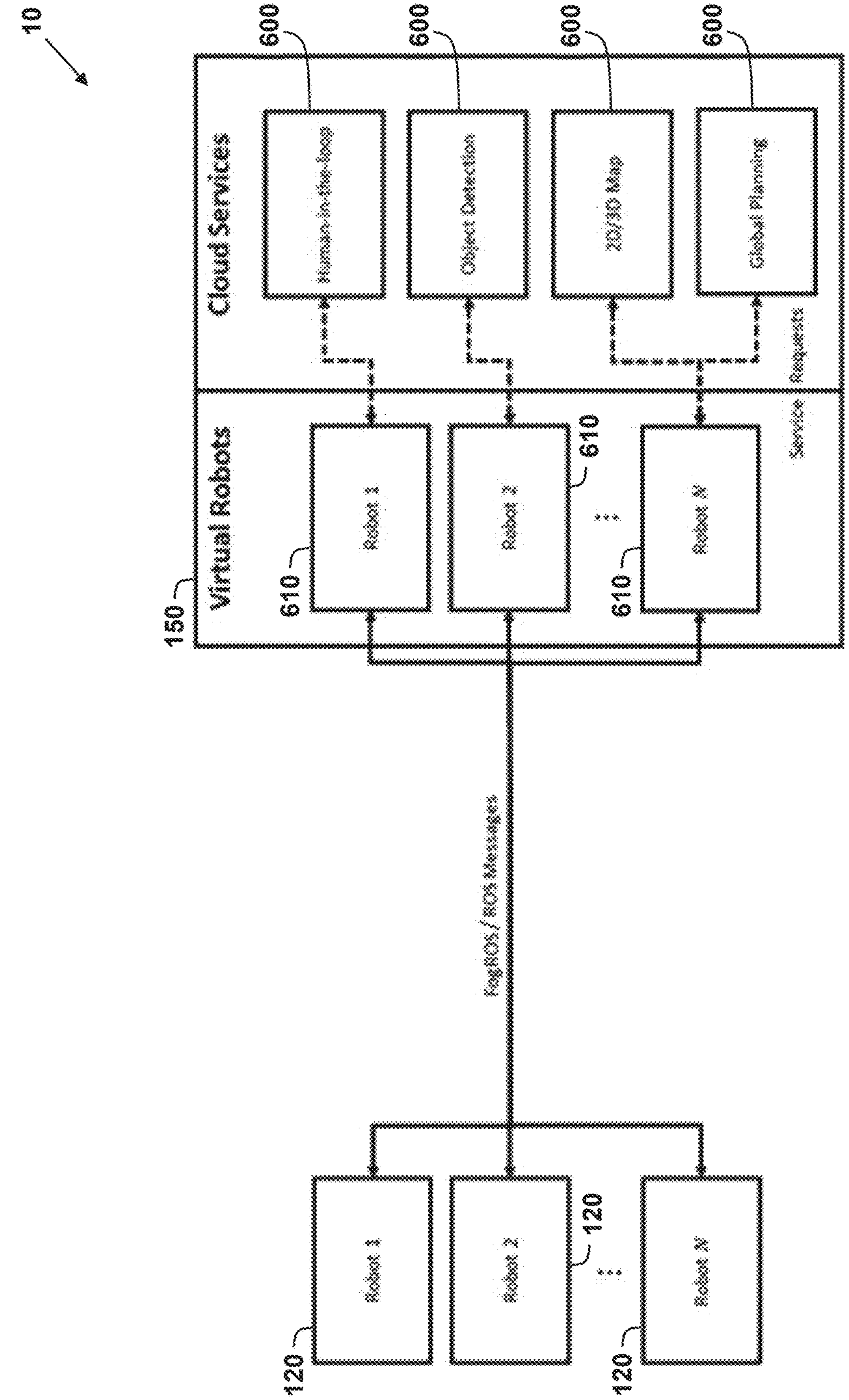
FIG. 7 shows one embodiment of the mobile robot system that incorporates cloud-based services.

In some embodiments, in addition to merely offloading computation tasks that could otherwise be performed by the mobile robot 120, the cloud system 150 is configured to provide services beyond the functionality of the mobile robot 120 alone. FIG. 7 shows one embodiment of the mobile robot system 10 that incorporates cloud-based services 600. Particularly, the cloud system 150 incorporates a services abstraction layer that hosts a variety of cloud-based services 600 that can be leveraged by the mobile robots 120. Such cloud-based services 600 may include, for example, human-in-the-loop remote operation (enabling a human operator to connect to the cloud to manually operate the mobile robot), object detection, 2D/3D mapping, global motion planning, grasping planning and detection, simultaneous localization and mapping (SLAM), or any other service.

It should be appreciated that, at least in some embodiments, the virtual robots 610 and/or the robot cloud nodes 30 perform computation tasks in an essentially similar manner as the mobile robot 120 would have performed the computation task locally, i.e., because they include copies of the same program instructions used by the mobile robot 120 to perform those computation tasks. However, in contrast, the cloud-based services 600 may perform equivalent computation tasks using different techniques that may provide higher quality or different results. In this way, the cloud-based services 600 enable the addition of and continuous improvement of services available to the mobile robots 120, without requiring updates to the software on the mobile robots 120 themselves.

As analogously discussed above, in some embodiments, the cloud system 150 receives a service request message from the mobile robot 120 including input data and indicating a service that is requested. The processor 154 receives the service request message from the mobile robot 120 and converts it into a format appropriate for the requested cloud-based service 600. Finally, the processor 154 operates the network communications module 160 to transmit a service output message to the mobile robot 120 that includes an output of the requested cloud-based service 600.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for operating a mobile robot, the method comprising:

receiving, with a local processing system of the mobile robot, input data with respect to which a computation task is to be performed;

determining whether the computation task is to be offloaded to a remote processing system for computation depending on whether the computation task relates to performance of a task requiring coordination between the mobile robot and at least one other mobile robot;

in response to determining that the computation task is to be offloaded to the remote processing system for computation, (i) transmitting, with a transceiver of the mobile robot, a message to the remote processing system, the message including the input data, and (ii) receiving, with the transceiver, an output of the computation task from the remote processing system;

in response to determining that the computation task is not to be offloaded to the remote processing system for computation, determining the output of the computation task using the local processing system; and operating, with the local processing system, the mobile robot based on the output of the computation task.

2. The method according to claim 1, wherein the input data is a user input identifying a task that is to be performed by the mobile robot.

3. The method according to claim 1, wherein the input data is sensor data measured by a sensor of the mobile robot.

4. The method according to claim 3, wherein the sensor data is an image of an environment captured by a camera of the mobile robot.

5. The method according to claim 4, wherein the computation task is detecting an object in the image.

6. The method according to claim 3, wherein the computation task is localizing at least one of a position and an orientation of the mobile robot in an environment.

7. The method according to claim 1, wherein the computation task is determining a trajectory with which the mobile robot is to navigate an environment.

8. The method according to claim 1, the determining whether the computation task is to be offloaded further comprising:

collecting profile data characterizing (i) performance of the computation task by the local processing system and (ii) performance of the computation task by the remote processing system; and determining whether the computation task is to be offloaded based on the profile data.

9. The method according to claim 8, wherein the profile data includes at least one of latencies, framerates, computation resource consumption, and computation costs.

10. The method according to claim 8, the determining whether the computation task is to be offloaded further comprising:

determining whether the computation task is to be offloaded based on at least one optimization criteria.

11. The method according to claim 10, wherein the at least one optimization criteria include at least one of minimizing computation time, minimizing computation costs, and maximizing battery life of the mobile robot.

12. The method according to claim 8 further comprising:

displaying the profile data on a display screen.

13. The method according to claim 1, the determining whether the computation task is to be offloaded further comprising:

determining the computation task is to be offloaded in response to the computation task relating to performance of the task requiring coordination between the mobile robot and the at least one other mobile robot.

14. The method according to claim 1, wherein:

the mobile robot has a first memory that stores first program instructions that are executed by the local processing system to perform a plurality of processes;

the remote processing system has a second memory that stores second program instructions that are executed by the remote processing system to perform the plurality of processes on behalf of the mobile robot, the second program instructions including a copy of at least part of the first program instructions; and the remote processing system determines the output of the computation task by executing the second program instructions based on the input data.

15. The method according to claim 14, wherein both the first program instructions and the second program instructions implement the plurality of processes using a middleware software library.

16. The method according to claim 14, wherein:

the second program instructions further include additional program instructions corresponding to second services that are different than first services implemented by the first program instructions of the mobile robot; and the remote processing system determines the output of the computation task in part by executing the additional program instructions corresponding to the second services.

17. The method according to claim 1 further comprising, in response to determining that the computation task is to be offloaded to the remote processing system for computation:

determining, with the remote processing system, the output of the computation task in part by simulating hardware of the mobile robot using a virtual robot model.

18. The method according to claim 1 further comprising, in response to determining that the computation task is to be offloaded to the remote processing system for computation:

determining, with the remote processing system, the output of the computation task based on a state of the mobile robot.

19. The method according to claim 1, in response to determining that the computation task is to be offloaded to the remote processing system for computation:

converting, with the remote processing system, a format of the message received from the mobile robot into a format corresponding to a middleware software library implemented by the remote processing system.

* * * * *